United States Patent
Palalau et al.

(10) Patent No.: US 6,373,472 B1
(45) Date of Patent: Apr. 16, 2002

(54) DRIVER CONTROL INTERFACE SYSTEM

(76) Inventors: Silviu Palalau, 1445 Holland, Birmingham, MI (US) 48009; Timothy J. Bomya, 6262 N. Crown St., Westland, MI (US) 48185

(*) Notice: Subject to any disclaimer, the term of this patent is extended or adjusted under 35 U.S.C. 154(b) by 1080 days.

(21) Appl. No.: 08/650,038

(22) Filed: May 17, 1996

Related U.S. Application Data (63) Continuation-in-part of application No. 08/543,686, filed on Oct. 13, 1995.

(51) Int. Cl.[7] .................................................. G09G 5/00
(52) U.S. Cl. ........................................ 345/173; 345/156
(58) Field of Search .............................. 345/156, 157, 345/173; 455/158.4; 340/459

(56) References Cited

U.S. PATENT DOCUMENTS

| | | | | |
|---|---|---|---|---|
| 4,806,904 A | | 2/1989 | Watanuki .................... 340/103 |
| 4,811,240 A | | 3/1989 | Ballou et al. ................ 364/518 |
| 4,827,520 A | | 5/1989 | Zeinstra ........................ 381/43 |
| 5,006,829 A | | 4/1991 | Miyamoto et al. .......... 340/459 |
| 5,128,659 A | | 7/1992 | Roberts et al. ............. 340/705 |
| 5,166,681 A | | 11/1992 | Bottesch et al. ............ 340/933 |
| 5,230,400 A | * | 7/1993 | Kakinami et al. .......... 180/169 |
| 5,239,700 A | | 8/1993 | Guenther et al. ......... 455/158.4 |
| 5,270,689 A | | 12/1993 | Hermann ..................... 345/145 |
| 5,327,117 A | | 7/1994 | Kohsaka ..................... 340/525 |
| 5,368,484 A | | 11/1994 | Cooperman et al. .......... 434/69 |
| 5,467,277 A | | 11/1995 | Fujisawa et al. ....... 364/424.05 |
| 5,474,453 A | * | 12/1995 | Copperman .................. 434/29 |
| 5,497,170 A | | 3/1996 | Kato et al. ...................... 345/9 |
| 5,504,482 A | | 4/1996 | Schreder ...................... 340/995 |
| 5,530,455 A | | 6/1996 | Gillick et al. ............... 345/163 |
| 5,539,429 A | | 7/1996 | Yano et al. .................. 345/173 |
| 5,552,806 A | | 9/1996 | Lenchik ...................... 345/156 |
| 5,555,502 A | | 9/1996 | Opel ....................... 364/424.05 |
| 5,578,985 A | * | 11/1996 | Cremers et al. ............ 340/461 |

FOREIGN PATENT DOCUMENTS

| | | |
|---|---|---|
| DE | 4328564 | 8/1994 |
| DE | 4338171 | 4/1995 |

OTHER PUBLICATIONS

Measurement and Control, vol. 25, No. 9, Nov. 1992 entitled "Advanced Integrated Driver Information Systems".

* cited by examiner

*Primary Examiner*—Bipin Shalwala
*Assistant Examiner*—Ricardo Osorio
(74) *Attorney, Agent, or Firm*—Niro, Scavone, Haller & Niro (57) ABSTRACT

A driver control interface controls the values of a plurality of features in a vehicle and displays information from the vehicle to the driver. A plurality of feature group switches are located on the steering wheel of the vehicle. Each of the vehicle features is associated with a feature group. Each of the feature group switches activates an associated feature group. A plurality of selection switches is also preferably located on the steering wheel for adjusting the values of the features associated with the activated feature group. An eyes-front display indicates the current value of a feature in an activated feature group.

17 Claims, 13 Drawing Sheets

DRIVER CONTROL INTERFACE SYSTEM

This is a continuation-in-part of copending application(s) Ser. No. 08/543,686 filed Oct. 13, 1995.

BACKGROUND OF THE INVENTION

This invention relates to a driver control interface for a vehicle.

Technology available in current vehicles has been rapidly increasing. As a result, the amount of information supplied to the driver and amount of input required from the driver has also been increasing.

Current vehicles typically include radios with cassette or compact disc players, advanced climate control systems with air conditioning and purification abilities, on-board navigational systems which operate in conjunction with global positioning satellites, collision avoidance systems, automobile self-diagnostic systems, cellular phones, pagers, rearview camera systems, radar detectors, anti-theft systems and remote controls.

Each additional system raises several concerns. First, all of the input and output interfaces for each of these systems must be located within the vehicle in an aesthetically acceptable manner. Second, the time and distance that the driver's attention is diverted from the road must be minimized, as should the time and distance that a driver's hands are diverted from the steering wheel while operating each of these systems. Further, as the complexity of systems in vehicles increases, the interface must be more user friendly so that all drivers can benefit from these systems.

SUMMARY OF THE INVENTION

The present invention provides a "hands-on", "eyes-front" driver control interface system which minimizes the time and distance that the driver's attention is diverted from the road and the time and distance that the driver's hands are diverted from the steering wheel while operating various systems in the vehicle. The vehicle includes a plurality of feature groups, such as audio, climate, etc., each having a plurality of associated features such as volume, balance, tuning, temperature, fan speed, etc. Each of these features has an associated value which is adjustable by the driver. Other features have a value which is only communicated to the driver for information purposes, such as engine temperature, tachometer, fuel level, speed, etc.

A high-resolution, reconfigurable display is located on the instrument panel directly in front of the steering wheel in an "eyes-front" position, i.e., the driver's focus need only be diverted slightly downward from the road.

The driver control interface system includes a plurality of feature group switches located on the vehicle steering wheel such that they are within reach of the driver's fingertips on one hand while the driver's hand is located comfortably in a normal position on the steering wheel ("hands-on"). Each of the feature group switches selectively activates one of the feature groups. The display indicates the currently-activated feature group and indicates the current value of features in the activated feature group.

A plurality of selection switches are also located just inside the periphery of the steering wheel adjacent a normal position of the driver's opposite hand ("hands-on"). The selection switches activate features within the activated feature group and adjust the values of the activated feature. Preferably, an enlarged graphic representing the activated feature appears upon activation of the feature. The driver control interface system includes control circuitry for implementing the adjusted value of the activated feature in the vehicle and for retrieving the information for the features in the activated feature group.

The driver control interface system can be customized and personalized. The driver selects a subset of the features in the vehicle to control from the steering wheel by assigning feature groups to the feature group switches. Further, the driver can change the colors, backgrounds, and information displayed for the feature groups. The driver control interface system continuously provides help to the driver for operating the various features.

A large number of features are operated by the driver of the vehicle without repositioning the driver's hands on the steering wheel. Further, the driver's attention is not diverted significantly from the road while adjusting the values of the features or receiving information from the display.

BRIEF DESCRIPTION OF THE DRAWINGS

The above, as well as other advantages of the present invention, will become apparent to those skilled in the art from the following detailed description of a preferred embodiment when considered in light of the accompanying drawings in which.

DETAILED DESCRIPTION OF THE PREFERRED EMBODIMENT

Figure 1:
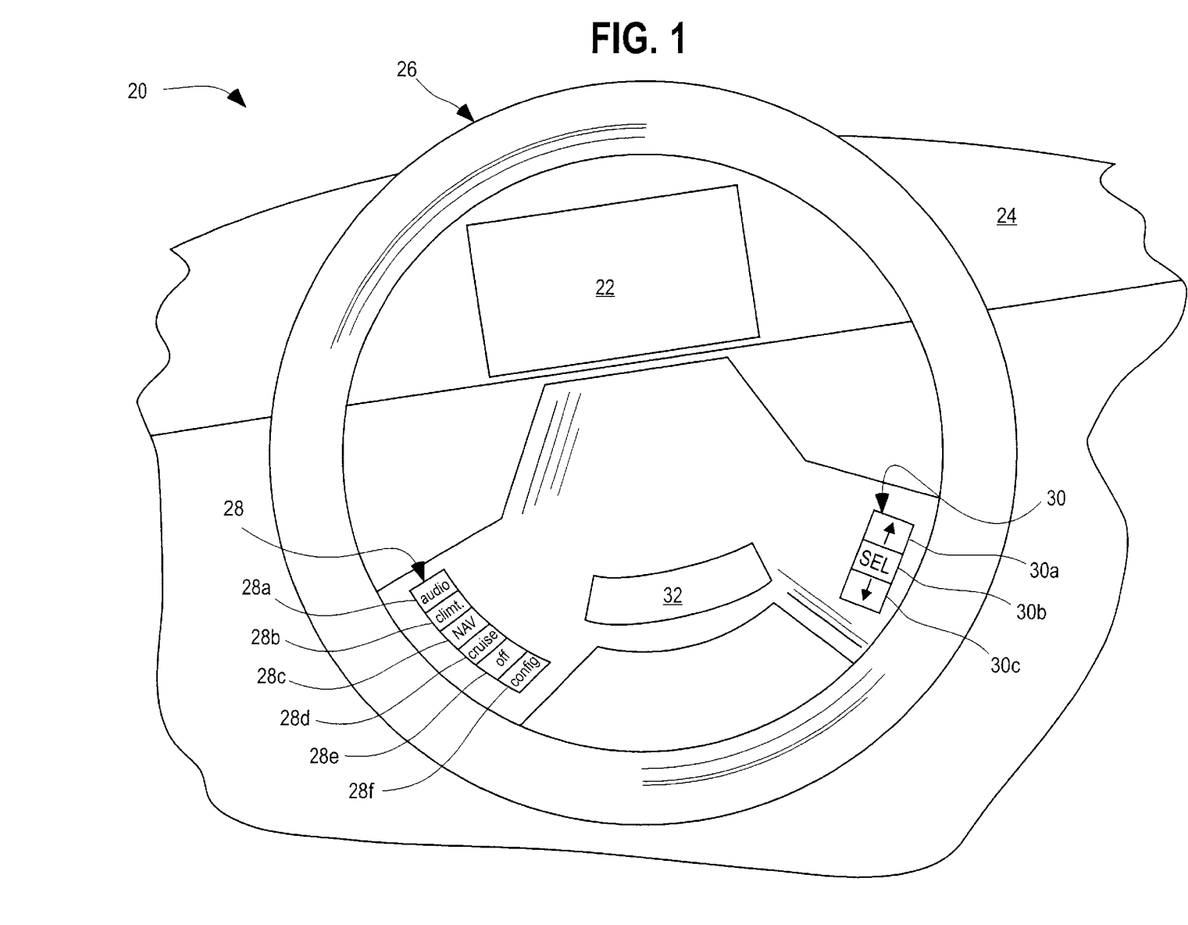
FIG. 1 illustrates a preferred embodiment of the present invention.

Referring to FIG. 1, a driver control interface system 20 according to a preferred embodiment of the present invention, includes a display 22 which is preferably a high-resolution, reconfigurable display. Preferably a liquid crystal display or a electro-luminescent display is used. The display 22 is located on the instrument panel 24 directly in front of the steering wheel 26 in an "eyes-front" position, i.e., the driver's focus need only be diverted slightly downward from the road to view the display. Further, while the driver is looking at the display 22, the driver's peripheral vision will still somewhat include the road in front of the vehicle. Alternatively, the display 22 could be a heads-up display, projected onto the windshield in front of the driver such that the driver need only focus his eyes far ahead to view the traffic or upon the windshield to see the displayed information.

Preferably a plurality of feature group switches 28 are located just inside the periphery of the steering wheel 26 such that they are within reach of the fingertips of one of the driver's hands while located comfortably in a normal position on the steering wheel 26 ("hands-on"). In this example, the feature group switches 28 would include an audio group switch 28a, a climate group switch 28b, a navigation group switch 28c, a cruise control switch 28d a cruise control off switch 28e, and a configure switch 28f.

Preferably a plurality of select switches 30 are also located just inside the periphery of the steering wheel 26 adjacent a normal position of the driver's opposite hand ("hands-on"). The select switches 30 preferably include an up arrow switch 30a, a select switch 30b, and a down arrow switch 30c. As an alternative to the switches 28, the driver control interface system 20 may also include a center touch screen 32, which will be discussed in more detail later.

Figure 2A:
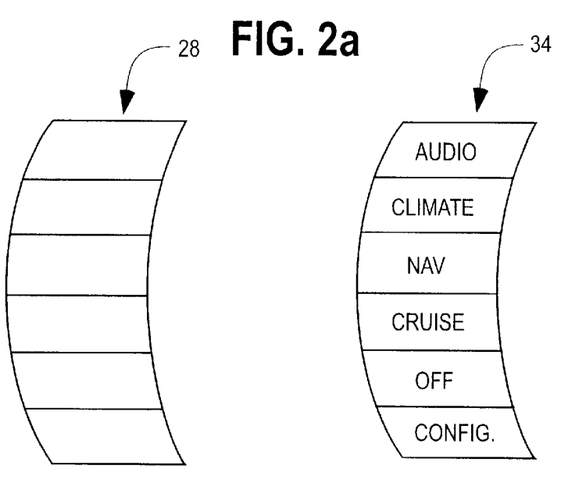
FIG. 2a illustrates an alternate embodiment of the function group switches shown in FIG. 1.

As shown in FIG. 2a, the feature group switches 28 could alternatively be located adjacent a group switch display 34. The group switch display 34 is a reconfigurable display which graphically indicates the current function of each of the feature group switches 28. The functions of each of the feature group switches 28 and the graphic indications in the group switch display 34 change to be personalized for each operator and change as appropriate based upon the user's previous selections to provide a series of menus and submenus. For example, upon activating the hard audio group switch 28a in FIG. 2a, hard switch 28a is subsequently reconfigured to activate the volume feature. The group switch display 34 is simultaneously reconfigured accordingly to indicate that switch 28a would select the volume feature.

Figure 2B:
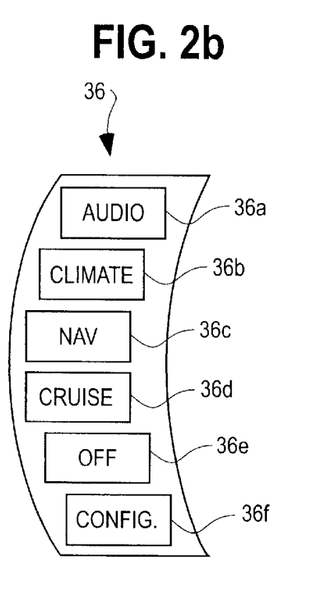
FIG. 2b illustrates another alternate embodiment of the function group switches of FIG. 1.

Alternatively, the feature group switches 28 could be replaced with a feature group switch touch screen 36, shown in FIG. 2b. The feature group touch screen 36 is a reconfigurable, high-resolution, touch-sensitive screen which graphically indicates areas of the screen 36a–f which represent the feature group switches 28a–f. The feature group switches 28a–f are activated by touching the graphical representations 36a–f of the feature group switches 28a–f. The feature groups associated with the feature group switches 28 can be personalized through the use of an external input board or through on-screen menus which are accessed by activating the configure switch 28f. Further, the functions performed by the feature group switches 28 can change based upon the user's previous selections, e.g. after activation of the audio group switch 28a, the touch screen 36 would be reconfigured into feature switches for selecting audio features within the audio feature group.

Figure 2C:
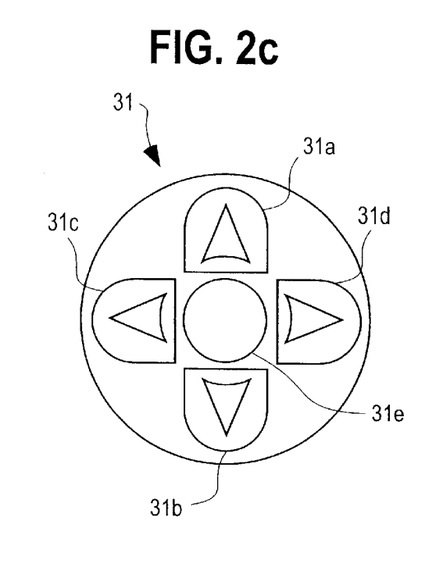
FIG. 2c illustrates an alternate embodiment of the select switches of FIG. 1.

The select switches 30 could alternatively be a mouse 31, shown in FIG. 2c. The mouse 31 includes an up switch 31a, down switch 31c, left switch 31d, right switch 31e, and center select switch 31f. The mouse 31 provides efficient control over a large number of features.

Figure 3:
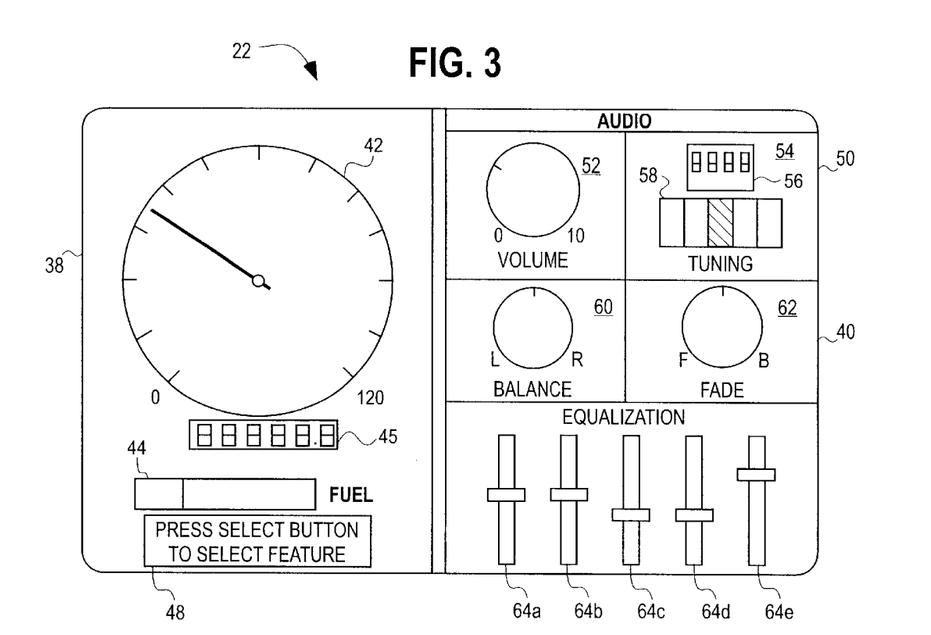
FIG. 3 illustrates the display of FIG. 1 with an activated audio feature group.

Referring to FIG. 3, the display 22 is preferably graphically divided into a first portion 38 and a second portion 40. In this example, the first portion 38 is generally the left half of the display 22 and the second portion 40 is generally the right half of the display 22. FIG. 3 illustrates one way of maintaining the speedometer graphic 42, fuel graphic 44, and odometer 45 at all times. Alternatively, the speedometer 42, fuel 44 and odometer 45 could be located in a separate display, or could be temporarily reduced or eliminated so that the second portion 40 covers the entire display 22. However, it is currently required by federal regulations that the speedometer 42, fuel 44, and odometer are displayed to the driver at all times.

The first portion 38 preferably includes a help graphic 48 which provides continuous instructions to the driver for operating the driver control system interface 20. FIG. 3 illustrates the display 22 after the driver has activated the audio group switch 28a, thereby activating the audio group graphic 50. The active audio group graphic 50 includes inactive audio feature graphics for each audio feature which indicate the current value of those audio features. For example, the active audio group graphic 50 includes an inactive volume graphic 52 which indicates the current value of the volume feature. The inactive tuning graphic 54 indicates the current frequency 56 and the current pre-set station selected 58. The inactive balance graphic 60 indicates the current value of the balance feature between the left and right speakers. The inactive fade graphic 62 indicates the current value of the fade feature between the front and back speakers. The inactive equalization graphics 64a–e indicate the current values for each of the frequency bands of the equalizer.

Figure 4:
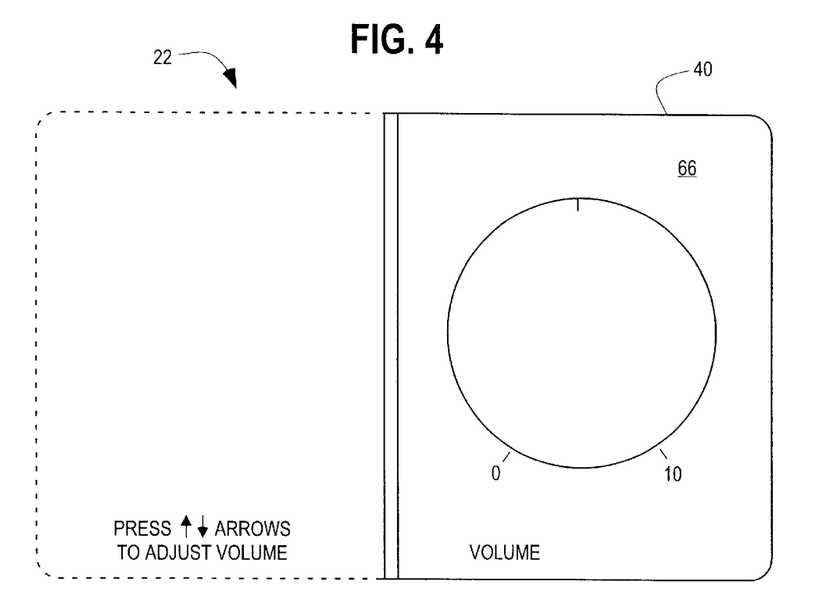
FIG. 4 illustrates the display of FIG. 1 with an activated audio volume feature.

After pressing the audio group switch 28a to activate the audio group graphic 50 as shown in FIG. 3, the driver then presses the select switch 30b to activate the first audio feature within the audio feature group, in this case, volume. This produces in the active volume graphic 66, as shown in FIG. 4, which is preferably magnified within the second portion 40 of the display 22. While the volume graphic 66 is in its active mode, the driver can adjust the value of the volume feature up or down by pressing the up arrow switch 30a or down arrow 30c, respectively. The value of the volume feature is continuously displayed by the active volume graphic 66.

The subsequent activation of the select switch 30b activates the next audio feature within the audio feature group, in this case the tuning feature. Preferably, the subsequent activation of the up arrow 30a or down arrow 30c would cycle the tuner through the pre-set stations previously selected by the user. Subsequent activations of the select switch 30b would sequentially activate the other audio features such as balance, fade, and each of the equalization bands, the value of which could each be adjusted up or down by activation of the up arrow switch 30a and down arrow switch 30c.

Figure 5:
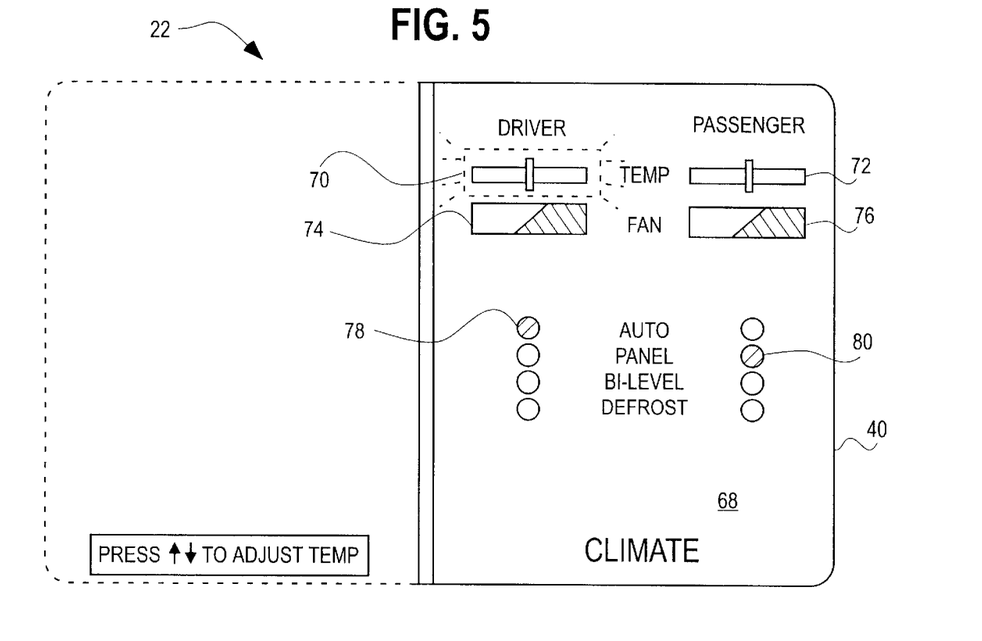
FIG. 5 illustrates the display of FIG. 1 with an activated climate feature group.

At any time, the driver can activate any of the other feature group switches 28 to activate a different feature group. For example, FIG. 5 shows the display 22 upon the activation of the climate group switch 28b. The active climate group graphic 68 would preferably occupy the second portion 40 of display 22. The active climate group graphic 68 would indicate the current values of each of the climate features such as driver temperature 70, passenger temperature 72, driver fan speed 74, passenger fan speed 76, driver air flow 78, and passenger air flow 80. Subsequent activation of the select switch 30b sequentially activates the climate features. The activated climate feature graphic may be magnified as demonstrated for the audio feature graphics, but preferably the climate feature graphics are highlighted or displayed in a different color from the inactive climate features. This is indicated in FIG. 5 by the dashed lines surrounding the driver temperature graphic 70. After activating a selected climate feature, the user can adjust the value of that climate feature by pressing the up arrow 30a or down arrow 30c. The driver can sequentially activate the climate features by pressing the select switch 30b or the driver can select another feature group by pressing a feature group switch 28.

Figure 6:
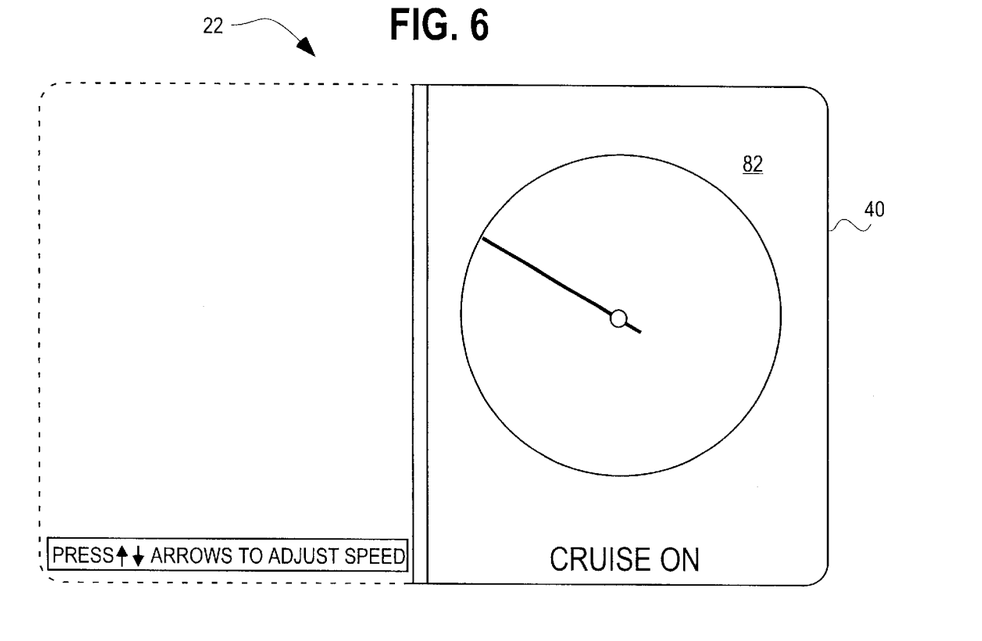
FIG. 6 illustrates the display of FIG. 1 with an activated cruise control feature.

FIG. 6 shows the active cruise control graphic 82 after activation of the cruise feature switch 28d. The setting of the cruise control feature can be adjusted by pressing the up arrow 30a or down arrow 30b. The cruise control feature can be turned off at any time by activating the cruise off switch 28e.

Figure 7A:
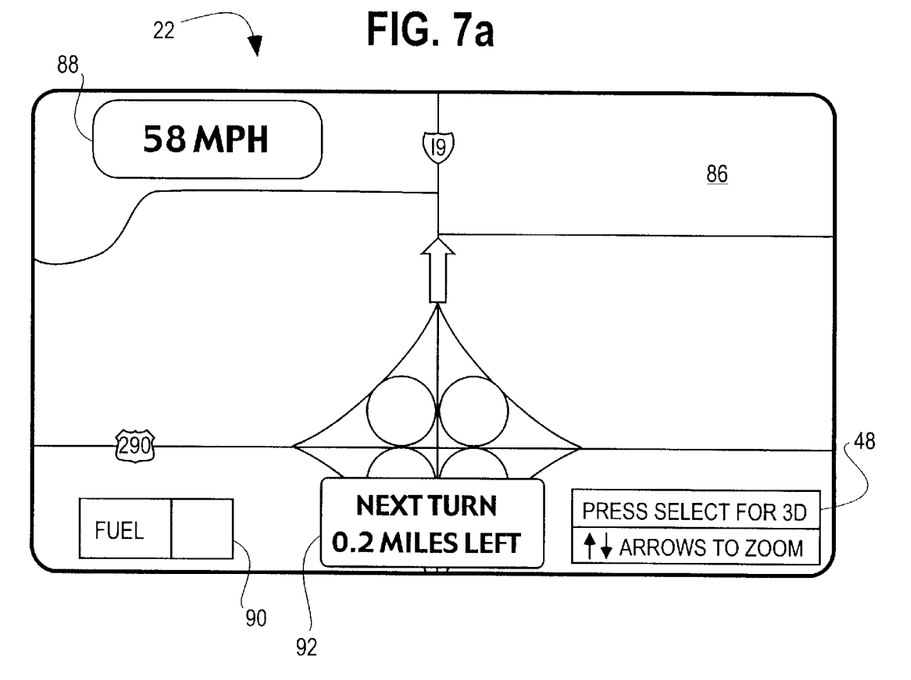
FIG. 7a illustrates the display of FIG. 1 with an activated navigational feature.
Figure 7B:
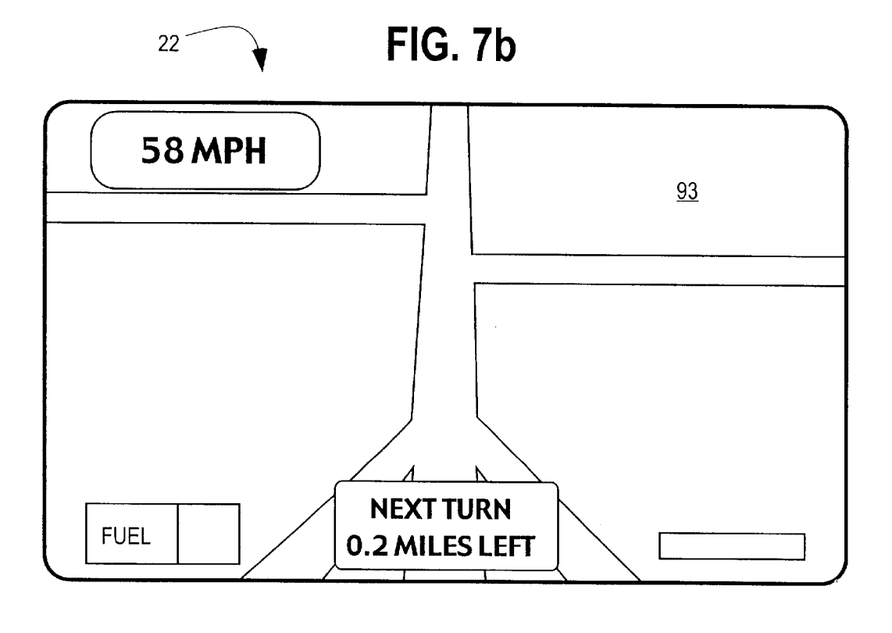
FIG. 7b illustrates the display of FIG. 7a with an enlarged, three-dimensional navigational feature.

FIG. 7a illustrates the display 22 after activating the navigation group switch 28c. FIG. 7a shows the active navigation graphic 86 in two-dimensional mode. The active navigation graphic 86 preferably occupies substantially the entire display 22, but a reduced speedometer graphic 88 and a reduced fuel level graphic 90 are displayed at all times. The active navigation graphic 86 generally displays the current location of the vehicle relative to a map of the surrounding area based upon information from a global positioning satellite combined with map information stored on an on-board CD-ROM player or other large storage device, the odometer, a compass and other information. The required navigation systems are currently commercially available. An instruction graphic 92 includes navigational instructions to the driver derived from the map in the on-board computer, information from the global positioning satellite, and the desired destination as indicated by the driver. The help graphic 48 is also displayed with the active navigation graphic 86. The help graphic 48 indicates to the driver instructions for accessing the different features of the navigation feature group. For example, by pressing the up arrow 30a or down arrow 30c, the driver can zoom in or out of the displayed map. For example, the driver can access a state map or a more local map. Further, by activating the select switch 30b, the user can switch to the "three-dimensional" display. The display 22 as shown in FIG. 7b shows the active navigation graphic 86 zoomed in from FIG. 7a and shown in "three-dimensional" mode. Preferably, in three-dimensional mode, the driver control interface system 20 transforms the two-dimensional data from the maps on the navigational CD-ROM to a simulated three-dimensional, perspective view. This feature will assist many drivers in visualizing their location on the map.

Figure 8:
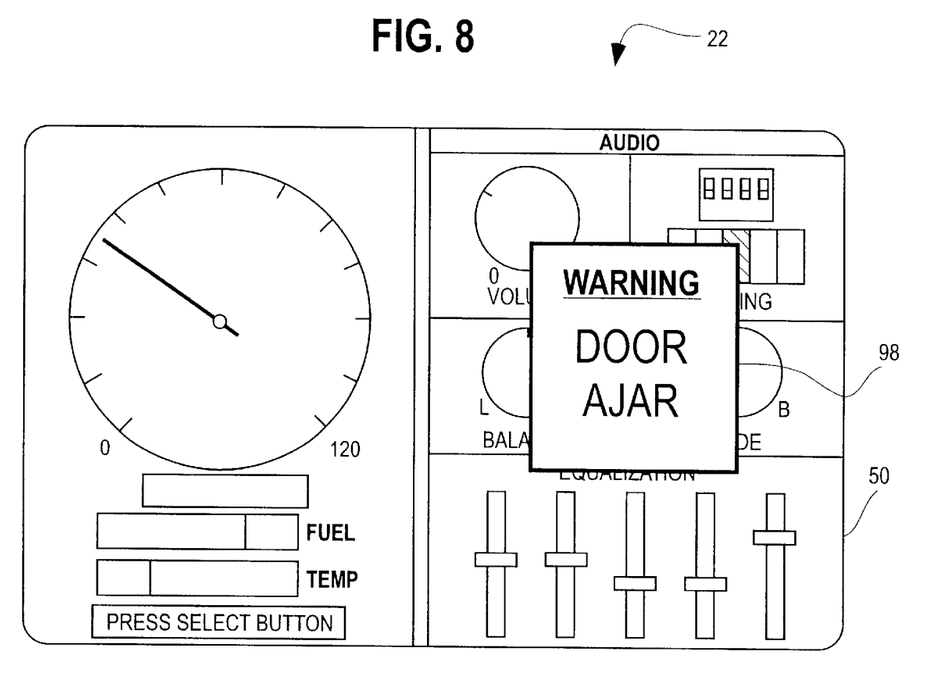
FIG. 8 illustrates the display of FIG. 3 with a superimposed warning message.

As shown in FIG. 8, any urgent information regarding the operation of the vehicle is preferably displayed in a warning graphic 98 which is superimposed over the current activated graphic, which, in this example is the active audio group graphic 50. The superimposed warning graphic 98 could be displayed for a predetermined length of time or until the driver acknowledges having seen the warning by pressing a feature group switch 28.

Figure 9A:
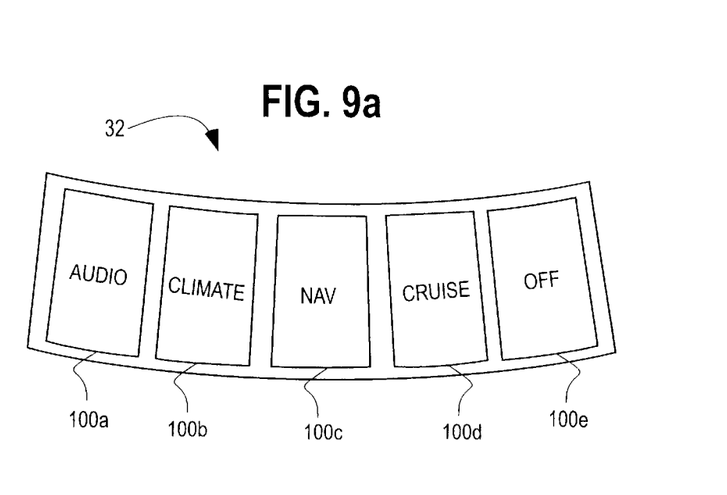
FIG. 9a illustrates the optional center touch screen of FIG. 1 in a first mode.
Figure 9B:
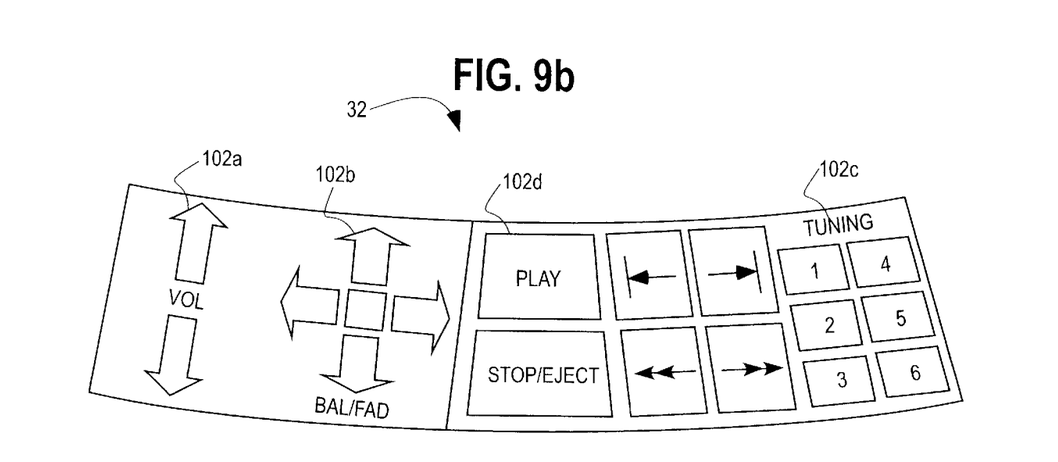
FIG. 9b illustrates the optional center touch screen of FIG. 9a with an activated audio feature group.

The center touch screen 32 is shown in more detail in FIG. 9a. The center touch screen 32 is preferably a high-resolution, reconfigurable, touch-sensitive screen located on the steering wheel 26. In FIG. 9a, the center touch screen 32 is shown displaying graphic representations 100a–f of the feature group switches 28a–f. The driver can activate the feature group switches 100a–f by touching the center touch screen 32 at the location of the graphical feature group switches 100a–f. These feature group switches 100a–f can activate the associated feature groups on display 22 as described above. Alternatively, activation of a switch 100a–f on the center touch screen 32 can initiate a reconfiguration of the center touch screen 32 into another set of graphical switches. For example, upon activating the audio feature group switch 100a on center touch screen 32, center touch screen 32 is reconfigured as shown in FIG. 9b. In this configuration, the center touch screen 32 would include graphical audio feature switches for volume 102a, balance 102b and tuning 102c. The touch screen 32 in FIG. 9b also includes a plurality of graphical switches 102d for operating a CD player.

Alternatively, activation of the switches 100a–f initiates a reconfiguration of the switches 28a–f. For example, activation of the audio switch 100a on the center touch screen causes the switches 28a–f to be reconfigured to activate the audio features such as volume, balance, etc. It should be apparent that the center touch screen 32 could also be located at the upper portion of the steering wheel 26 and could alternatively comprise a plurality of hard switches, or a combination of hard switches with a reconfigurable display, rather than a touch screen.

Figure 9C:
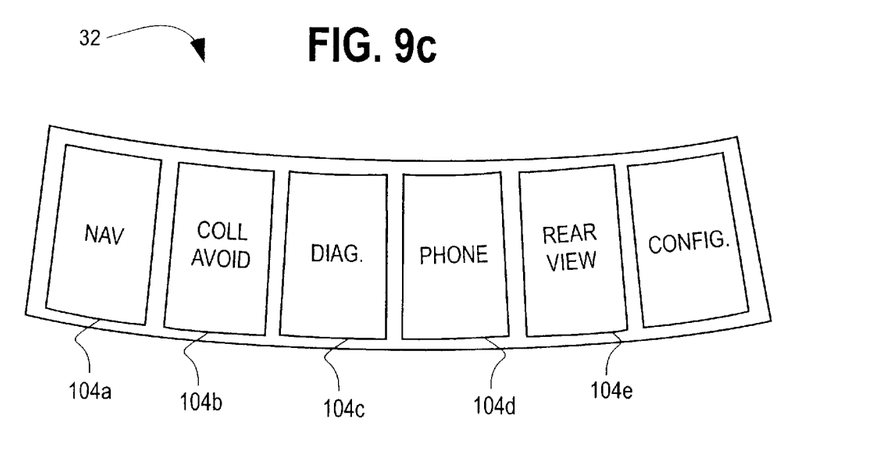
FIG. 9c illustrates the optional center touch screen of FIG. 9a in a third mode.
Figure 9D:
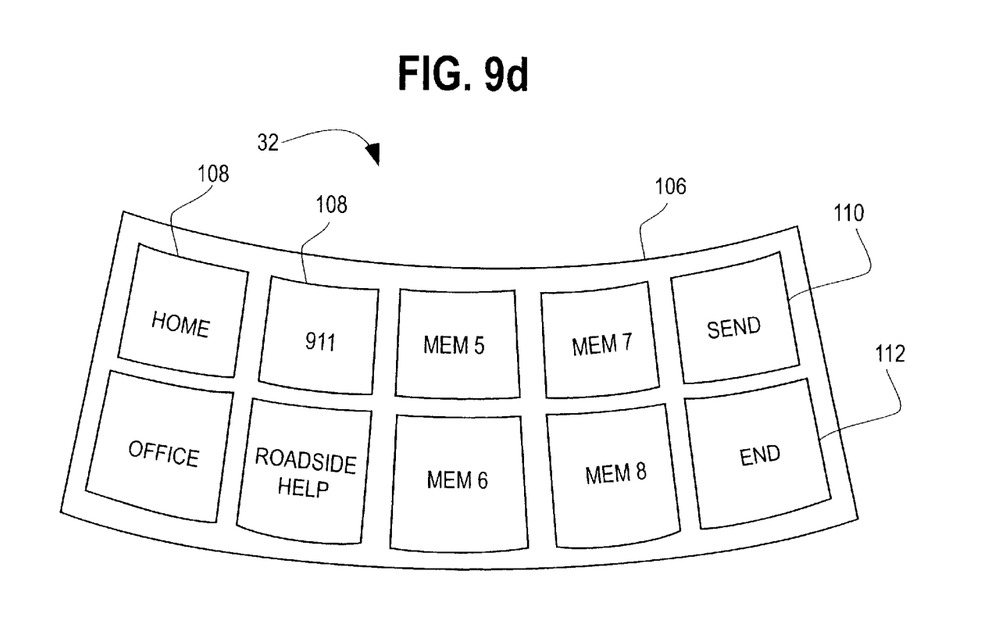
FIG. 9d illustrates the optional center touch screen of FIG. 9c with an activated cellular phone feature group.

The center touch screen 32 can also be reconfigured as shown in FIG. 9c to include a different sub-set of the available feature groups in a vehicle, such as navigation 104a, collision avoidance 104b, diagnostic 104c, cellular phone 104d, and rearview camera 104e. By pressing the cellular phone feature group switch 104d, the driver activates the cellular phone graphic 106 as shown in FIG. 9d on center touch screen 32. The activated cellular phone group graphic 106 preferably includes several graphical buttons 108 for previously stored telephone numbers, as well as a graphical send button 110 and a graphical end button 112.

Figure 10:
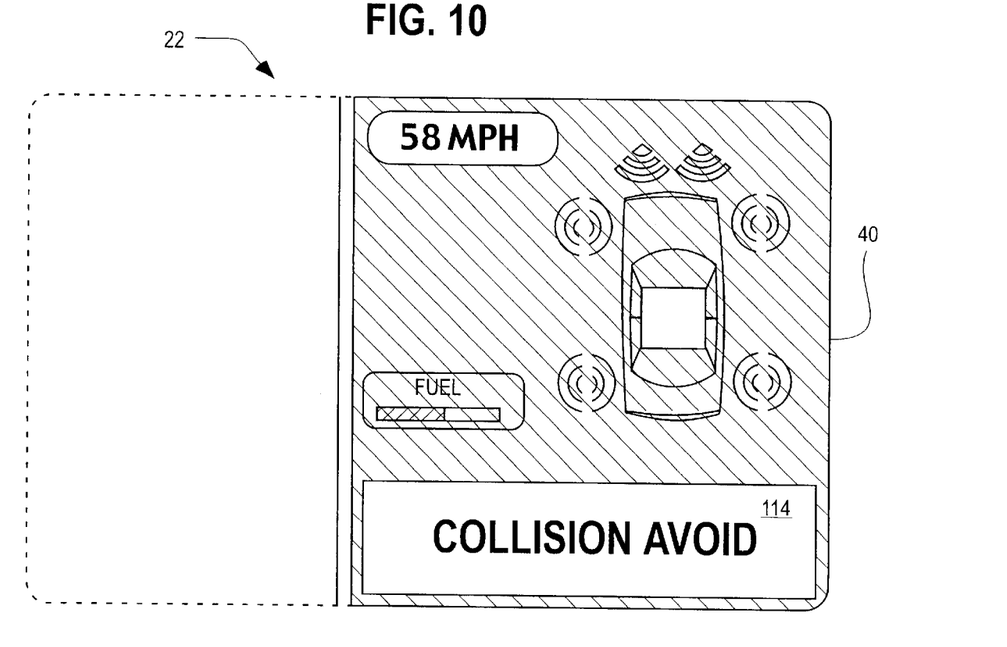
FIG. 10 illustrates the display of FIG. 1 with an activated collision avoidance feature.

Activation of the collision avoidance feature group switch 104b activates the collision avoidance graphic 114 as shown in FIG. 10, which occupies generally the second portion 40 of the display 22. The collision avoidance system incorporates ultrasound, acoustic, radio frequency ("RF"), infrared ("IR"), LED or laser systems to provide the typical driver with additional information pertaining to the "blind spots" and to assist trucks in backing up without a mishap. These systems are also commercially available.

Figure 11:
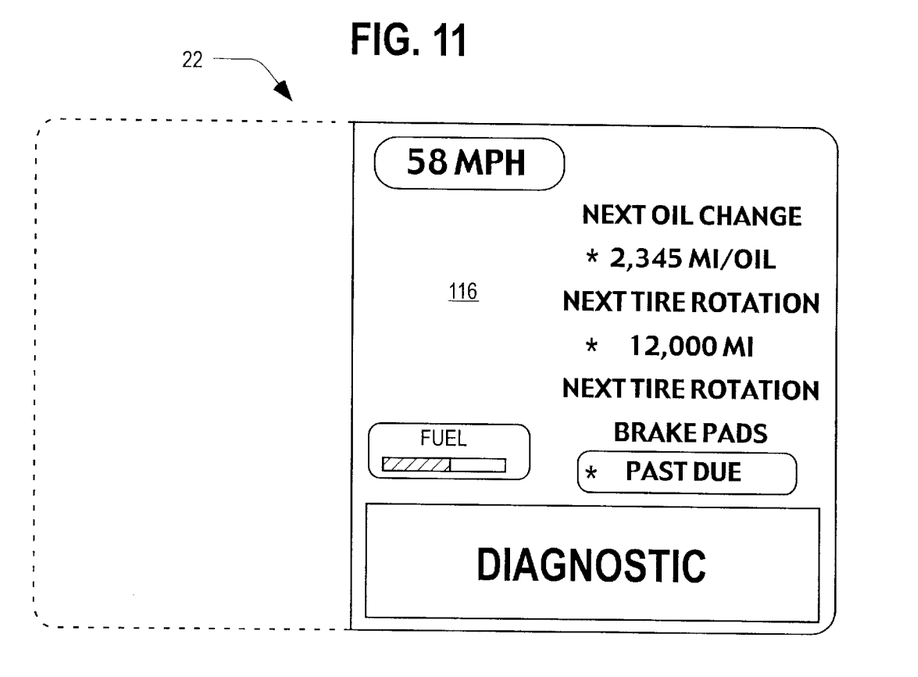
FIG. 11 illustrates the display of FIG. 1 with an activated diagnostic feature.

Referring to FIG. 11, diagnostic information can be displayed by activating the diagnostic feature group button 104c on center touch screen 32 from FIG. 9c. The activated diagnostic graphic 116 displays maintenance needs, including oil change, tire rotation and brake pads.

Figure 12A:
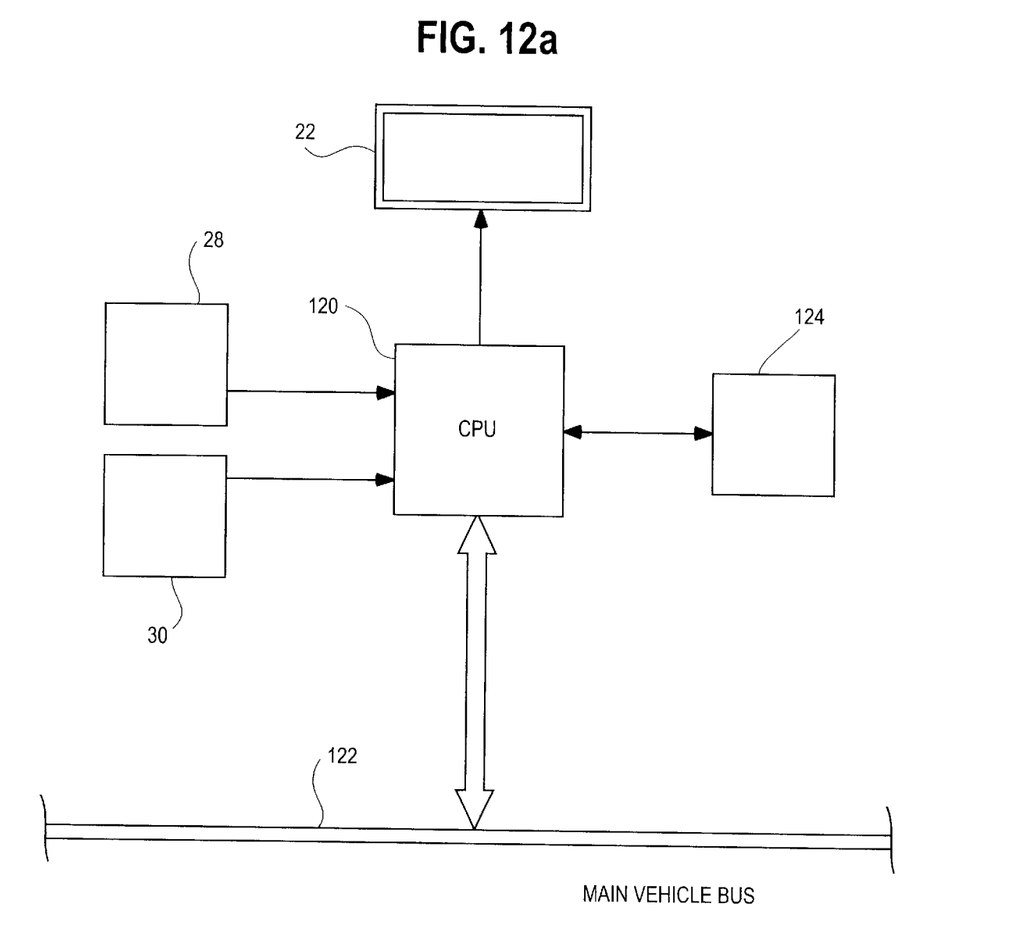
FIG. 12a is a schematic of circuitry which can be used to implement the driver control interface system of FIG. 1 in a vehicle.

FIG. 12a illustrates one possible schematic for implementing the values adjusted by the driver and for retrieving information to be displayed to the driver on the driver control system interface 20. The feature group switches 28 and select switches 30 are input to a CPU 120 which operates the display 22. The CPU 120 is also connected to the vehicle's main bus 122. The main bus 122 preferably carries information and commands for numerous vehicle components, including speed, engine operating information, climate control, audio and other electronic systems, etc. Any other systems, for example the navigational system 124, which do not operate on the vehicle main bus 122, are connected directly to the CPU 120.

Figure 12B:
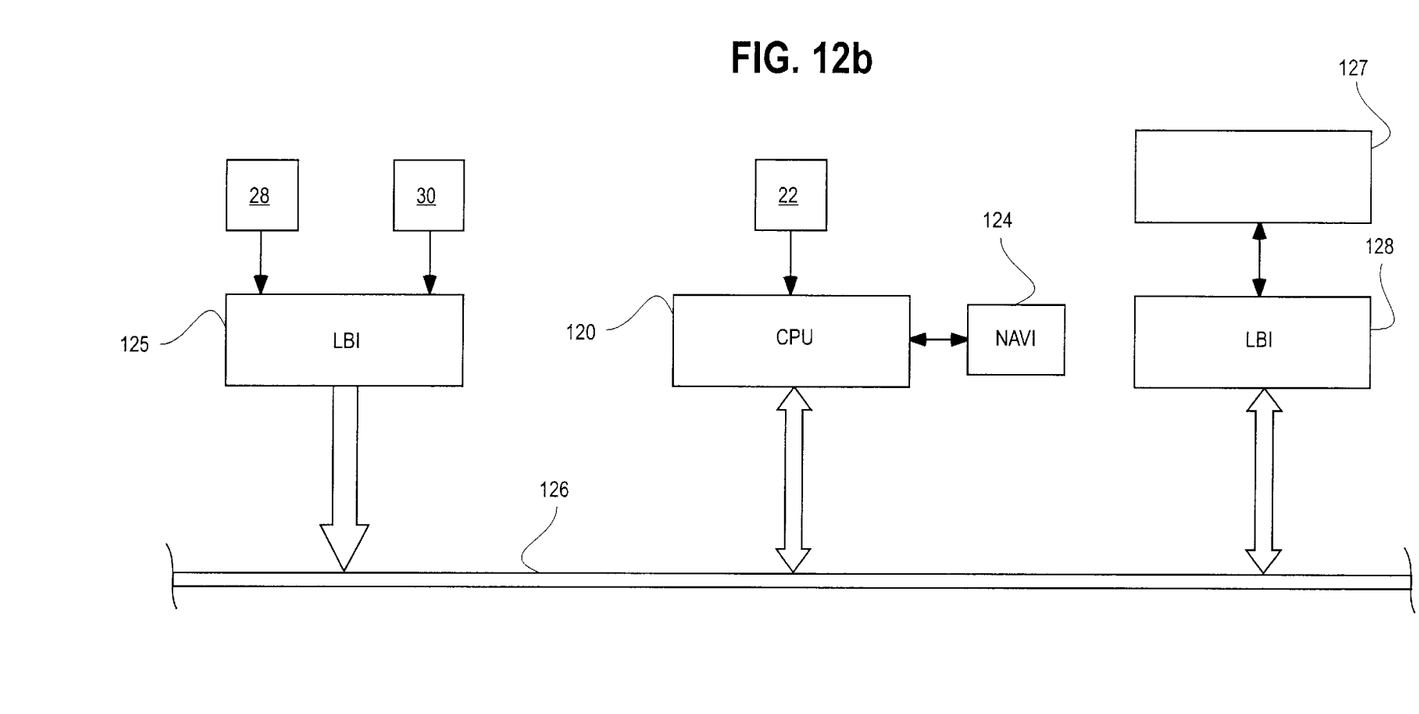
FIG. 12b is an alternate schematic for implementing the driver control interface system of the present invention in a vehicle.

FIG. 12*b* illustrates an alternative schematic for implementing the driver control interface system 20. The switches 28, 30 are connected via a local bus interface 125 to the bus 126 which carries the signals to the CPU 120. The CPU 120 operates the display 22 and receives information from the navigational system 124. An input device 127, such as a keyboard, mouse, etc., to be accessible by both the driver and passenger is also connected via a local bus interface 128 to the bus 126 which carries signals to the CPU 120.

Figure 13A:
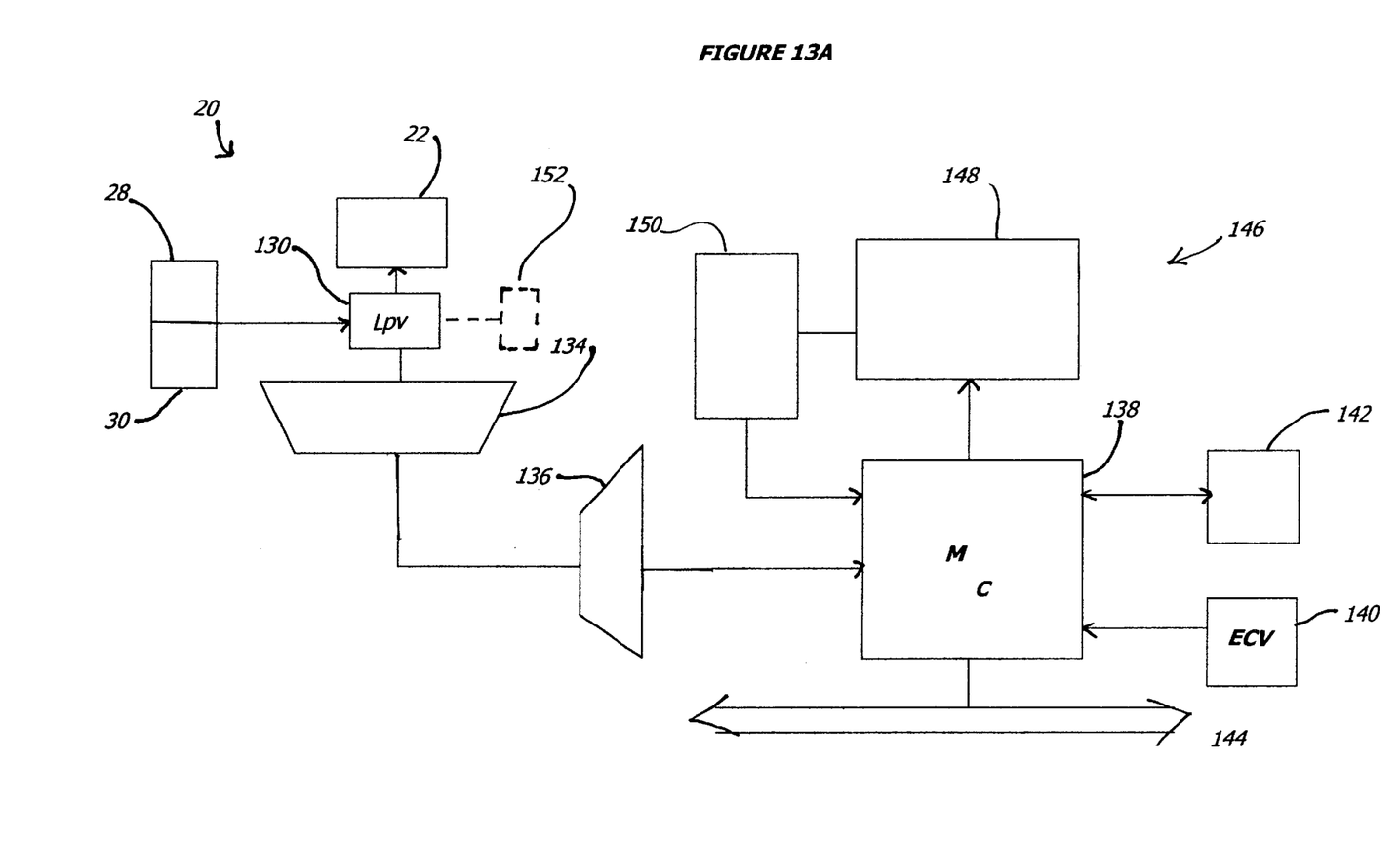
FIG. 13a is another alternate schematic for implementing the driver control interface system of the present invention in a vehicle.

FIG. 13*a* illustrates another schematic for implementing the driver control interface system 20. In this embodiment, the display 22 and switches 28, 30 are connected to a CPU 130. The CPU 130 is connected via a multiplexer 134 and demultiplexer 136 to an auxiliary controller 138. The auxiliary controller 138 controls non-safety, non-critical functions, such as climate control, audio, etc. and receives information from the engine control unit 140 and from the navigational system 142. The controller 138 sends and receives commands and information related to most of the vehicle features from the main vehicle bus 144, such as audio, climate, speed, fuel, temperature, etc. The driver control interface system 20 is preferably a redundant or secondary interface. There is preferably a main interface 146 that is shared with the passenger of the vehicle. The main interface 146 includes a display 148 and an input device 150, such as a keyboard, mouse or touch screen. The main interface 146 operates all of the vehicle features and preferably contains a menu for personalizing the driver control interface system 20.

Figure 13B:
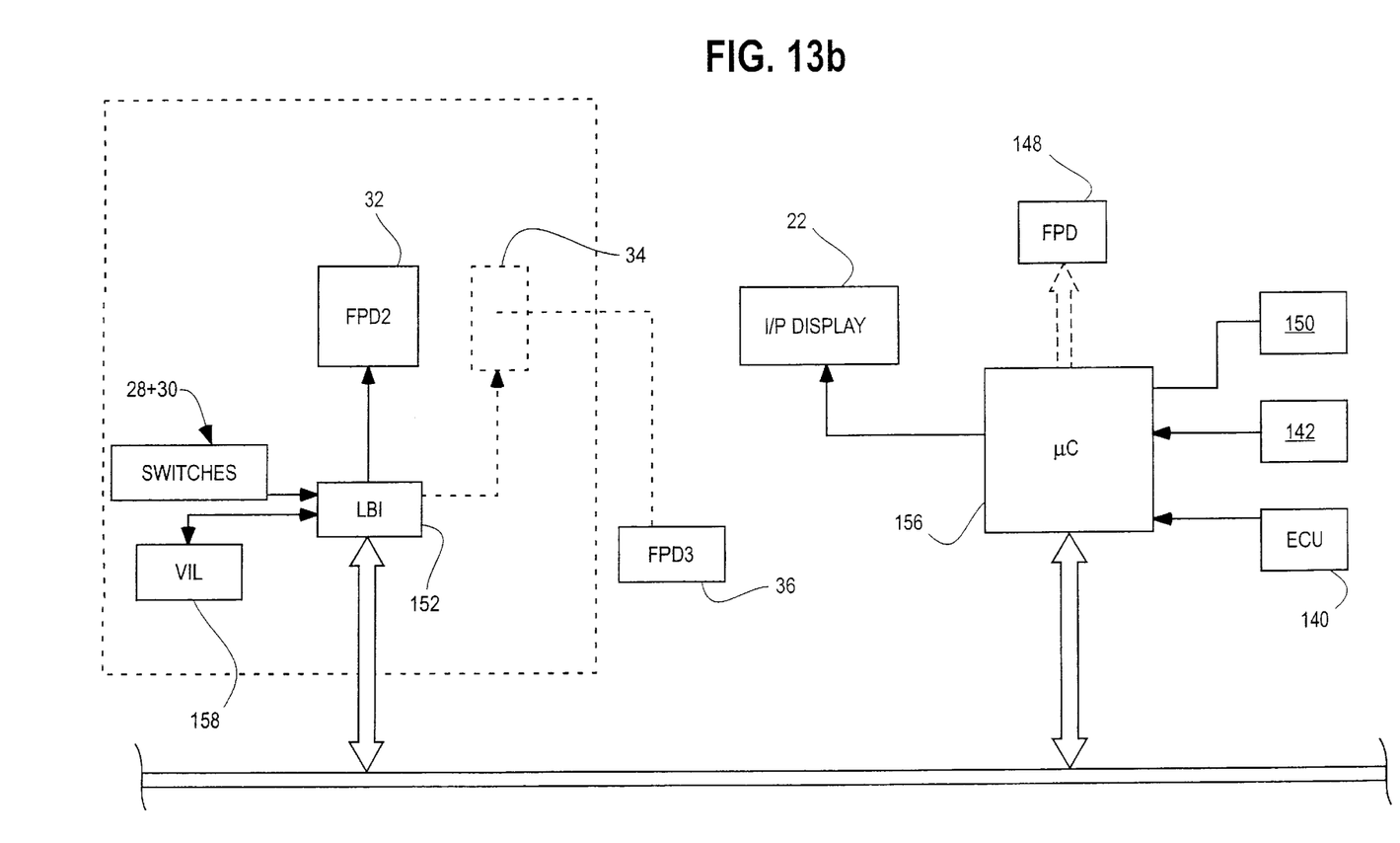
FIG. 13b is another alternate schematic for implementing the driver control interface system of the present invention in a vehicle.

FIG. 13*b* illustrates another schematic which could be used to implement the driver control interface system 20. The feature group switches 28 and select switches 30 are connected via a local bus interface 152 to a bus 154 which carries signals to a controller 156. The local bus interface 152 also retrieves graphics and text from a video image library 158 for display on the center touch screen 32. The video image library 158 may also contain graphical information for display on the feature group display 34 or the feature group touch screen 36, if available. The controller 156 receives information from the engine control unit 140 and the navigational system 142. The controller 156 also drives the display 22 and the display 148 for the main interface 146 and receives commands from the main interface input device 150.

Preferably, the driver control interface system 20 can be personalized several ways. As discussed above, the feature groups associated with the feature group switches 28 is preferably a user-definable subset of the available set of feature groups in the vehicle. Further, the active and inactive graphics for each feature group and feature can preferably be personalized as well. For example, some drivers may prefer gauges for the vehicle functions such as oil pressure, engine temperature, alternator, tachometer, etc., while other drivers prefer simple warning lights which only appear when there is a problem with the vehicle function. Further, the backgrounds, colors, styles, sizes, fonts of the graphics can be selected for the particular driver. These features are preferably customized using the main interface 146 or an external input board 152 (shown in dashed lines) which connects to the CPU 130 for the driver control interface system 20. The input board would be available at automobile dealerships.

The controls and systems for implementing the changes directed by the inventive interface systems are known by one of ordinary skill in the art. It should be apparent that the steering wheel 26 is shown for illustrative purposes only and it is contemplated that vehicles might have alternative directional input devices. For example, the auto industry is currently investigating "drive-by-wire" systems which could utilize joysticks or other electronic input devices by which the driver could steer the vehicle. In order to achieve the safety and convenience benefits as described above, the driver should not be required to significantly reposition his hands from the directional input device while interfacing with the driver control interface 20.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A driver control interface for controlling the values of a plurality of user-adjustable features in a vehicle, said driver control interface comprising:

a steering wheel for steering the vehicle;

a plurality of feature group switches supported on said steering wheel, each said feature being associated with a feature group, said feature group switches selectively activating said feature groups;

a plurality of selection switches supported on said steering wheel and spaced from said feature group switches, said selection switches adjusting the values of said features associated with said activated feature group;

a display supported on an instrument panel in the vehicle forward of said steering wheel and displaying an activated feature group, said display indicating the current value of a feature in said activated feature group; and control circuitry for implementing said adjusted value of said activated feature in said vehicle.

2. The driver control interface of claim 1 wherein said selection switches selectively activate a feature from said activated feature group, said selection switches selectively adjusting the value of said activated feature.

3. The driver control interface of claim 1 wherein each said feature group switch activates one of said feature groups.

4. The driver control interface of claim 3 wherein said plurality of feature group switches activate a user-definable subset of said feature groups.

5. The driver control interface of claim 1 wherein said plurality of selection switches sequentially activates said features associated with said activated feature group.

6. The driver control interface of claim 5 wherein said selection switches adjust the value of said activated feature.

7. The driver control interface of claim 1 wherein said display displays a first graphic for each feature in said activated feature group when said feature is not activated and a second graphic for each feature in said activated feature group when said feature is activated.

8. The driver control interface of claim 1, wherein said feature group switches are provided on a touch-sensitive screen that is separate from said display.

9. The driver control interface of claim 8 wherein said touch sensitive screen is reconfigurable to display an activated feature group, and also to provide said selection switches.

10. The driver control interface of claim 1 further including a feature group switch display adjacent said plurality of feature group switches, said feature group switch display indicating the feature group associated with each said feature group switch.

11. The driver control interface of claim 10 wherein said switch display is reconfigurable to display selection switches for an activated feature group.

12. The driver control interface of claim 1 wherein said selection switches allow selection of one feature in said feature group for adjustment.

13. The driver control interface of claim 12 wherein said selected one feature is enlarged on said display after selection.

14. The driver control interface of claim 1 wherein said display is an eyes-front display.

15. A driver control interface for controlling the values of a plurality of user-adjustable features in a vehicle, each said feature being associated with a feature group, said driver control interface comprising:

a steering wheel supported within the vehicle for steering the vehicle;

a display positioned forward of and separate from said steering wheel;

a first switch arrangement supported on said steering wheel for selectively activating a feature group on said display;

a second switch arrangement supported on said steering wheel for activating a feature from said activated feature group on said display;

means for adjusting a value of said activated feature; and means for implementing said adjusted value of said activated feature in said vehicle.

16. The driver control interface of claim 15, wherein said first switch arrangement comprises a plurality of switches.

17. A driver control interface for controlling the values of a plurality of user-adjustable features in a vehicle, said driver control interface comprising:

a steering wheel;

a plurality of feature group switches supported on said steering wheel adjacent the periphery of said steering wheel, each said feature being associated with a feature group, each of said feature group switches selectively activating one of said feature groups;

a plurality of selection switches supported on said steering wheel adjacent the periphery of said steering wheel, said selection switches selectively activating a feature from said activated feature group, said selection switches selectively adjusting the value of said activated feature; and a display located directly forward of said steering wheel, said display displaying an activated feature group, said display indicating the current value of a feature in said activated feature group.

* * * * *